(No Model.)
F. O. WELLINGTON.
MACHINERY FOR SOWING FERTILIZING MATERIAL.
No. 319,155. Patented June 2, 1885.
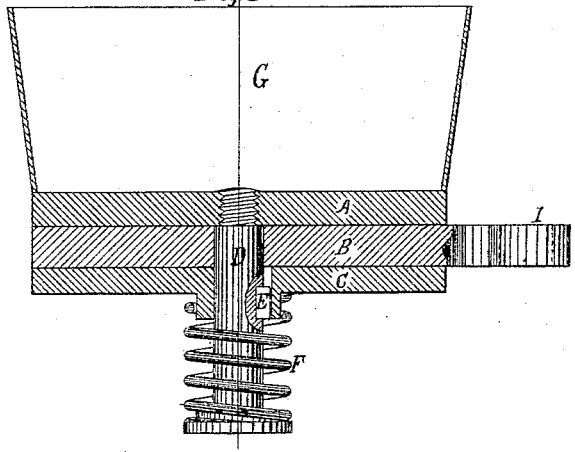
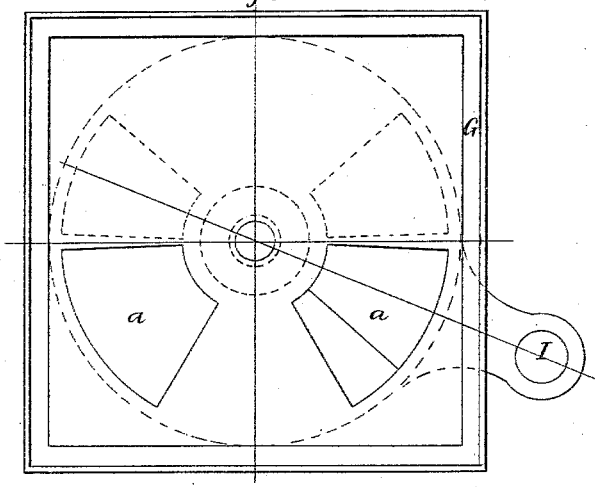
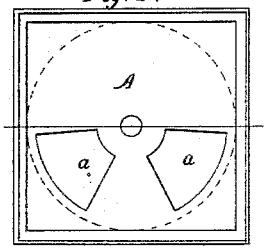 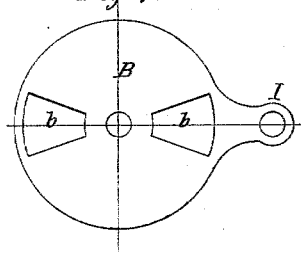 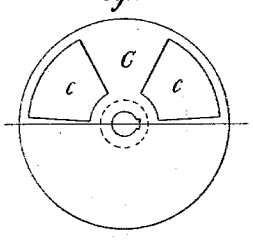
Witnesses.
S. N. Piper
E. P. Pratt
Inventor,
Frank Oliver Wellington.
by R. H. Eddy atty.

UNITED STATES PATENT OFFICE.

FRANK OLIVER WELLINGTON, OF BOSTON, MASSACHUSETTS.

MACHINERY FOR SOWING FERTILIZING MATERIAL.

SPECIFICATION forming part of Letters Patent No. 319,155, dated June 2, 1885.

Application filed June 17, 1884. (No model.)

*To all whom it may concern:*

Be it known that I, FRANK OLIVER WELLINGTON, of East Boston, in the county of Suffolk, of the Commonwealth of Massachusetts, have invented a new and useful Improvement in Machinery for Sowing Fertilizing Material; and I do hereby declare the same to be described in the following specification, and represented in the accompanying drawings, of which—

Figure 1 is a transverse section, and Fig. 2 a top view, of the hopper of a fertilizer-sowing machine provided with my invention, the nature of which is defined in the claim hereinafter presented. Fig. 3 is a top view of the said hopper. Fig. 4 is a top view of its perforated disk, while Fig. 5 is a top view of the vertically-movable perforated discharging plate or disk.

The machine, though intended specially for sowing a fertilizer, can often be employed to advantage in sowing seed or discharging it from the hopper while such may be drawn or moved over a field or piece of ground.

In the said drawings, G denotes the hopper, having a headed bolt, D, screwed into and extending down from its bottom A, such bottom having through it two segmental openings, $a$ $a$, arranged, as represented in Fig. 3, in one half of it. Underneath the said bottom is a discharging-disk, C, which on and concentric with the bolt D is adapted to slide freely upward and downward, but not to revolve thereon, such disk being kept from revolving by a short spline or feather, E, extending from the bolt into a vertical groove in the hub of the said disk C. A spiral spring, F, surrounding the shank of the bolt and resting on the bolt-head, presses upward the disk C, which has extending through it, on one side of its diameter, two segmental openings, $c$ $c$.

Between the disk C and the bottom A of the hopper there is interposed the perforated rotary discharger or disk B, which is provided with two segmental openings, $b$ $b$, arranged in it diametrically and on opposite sides of its center, as shown in Fig. 4. There projects from the discharger B a handle or ear, I, for reciprocating it upon the bolt D, upon which it turns, and which goes through it concentrically.

On the hopper being charged with a fertilizing material in a comminuted state and the discharger put in movement, so as to carry each hole $b$ of it in succession from under one of the holes $a$ to and over one of the holes $c$, such hole $b$ will become charged with the material, which will be held therein until such hole may be carried over one of the holes $c$, through which the said material will be discharged from the said hole $b$. In case of the discharger B becoming clogged or stopped, as it is liable to by the fertilizing material, which, generally speaking, is of a sticky or adhesive character, and has in it more or less lumps or hard matters, the spring will allow the disk C to give way in order to allow of the discharger B to move away from the bottom A to overcome the obstruction.

It has been found in practice that without the disk C being movable, as described, and provided with the spring to force it and the discharger B upward toward the hopper, the discharger cannot be operated to proper advantage, even when seed, instead of fertilizing material, may be used in the hopper.

What I claim in a fertilizer-sower is—

The combination, substantially as described, of the hopper having through it the perforations $a$ $a$ on one side of the median line of its bottom, the discharger B, having the perforations $b$ $b$ on opposite sides of its center, the disk C, having the perforations $c$ $c$ on one side of its diameter, the headed bolt D, and the spring F, all arranged and applied essentially in manner and to operate as and for the purpose set forth.

FRANK OLIVER WELLINGTON.

Witnesses:
R. H. EDDY,
E. B. PRATT.